US012050124B2

(12) United States Patent
Chanpura et al.

(10) Patent No.: US 12,050,124 B2
(45) Date of Patent: Jul. 30, 2024

(54) USE OF VIBRATION INDEXES AS CLASSIFIERS FOR TOOL PERFORMANCE ASSESSMENT AND FAILURE DETECTION

(71) Applicant: Halliburton Energy Services, Inc., Houston, TX (US)

(72) Inventors: Reena Agarwal Chanpura, Houston, TX (US); Jie Yang, Houston, TX (US); Cristian Lenin Sosareyes, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 434 days.

(21) Appl. No.: 17/492,379

(22) Filed: Oct. 1, 2021

(65) Prior Publication Data
US 2023/0117396 A1 Apr. 20, 2023

(51) Int. Cl.
*E21B 49/00* (2006.01)
*E21B 44/00* (2006.01)
*E21B 47/14* (2006.01)
*G01H 1/00* (2006.01)
*G05B 23/02* (2006.01)
*G06N 20/00* (2019.01)

(52) U.S. Cl.
CPC ............. *G01H 1/003* (2013.01); *E21B 44/00* (2013.01); *G05B 23/0283* (2013.01); *G06N 20/00* (2019.01)

(58) Field of Classification Search
CPC ..... G01H 1/003; E21B 44/00; E21B 2200/22; G05B 23/0283; G05B 23/024; G06N 20/00; G06N 3/0464; G06N 3/084; G06N 3/09
See application file for complete search history.

(56) References Cited

U.S. PATENT DOCUMENTS

| 10,168,444 | B2 | 1/2019 | Jachmann et al. |
| 11,048,014 | B2 | 6/2021 | Yang et al. |
| 2012/0089336 | A1* | 4/2012 | Garvey ................... E21B 41/00 702/9 |
| 2015/0095100 | A1 | 4/2015 | Vittal et al. |
| 2015/0167454 | A1* | 6/2015 | Kale ...................... E21B 49/003 702/9 |
| 2017/0030181 | A1* | 2/2017 | Thomas .................. E21B 44/04 |
| 2018/0120201 | A1 | 5/2018 | Dashevskiy et al. |

(Continued)

OTHER PUBLICATIONS

JPT, Schlumberger's Drilling ECG goes to the Heart of the Matter to Diagnose Abnormal Conditions in Real Time, 2003.

*Primary Examiner* — Kenneth M Lo
*Assistant Examiner* — Tameem D Siddiquee
(74) *Attorney, Agent, or Firm* — Benjamin Ford; C. Tumey Law Group PLLC

(57) ABSTRACT

Systems and methods are disclosed for identifying one or more vibration mechanisms or other mechanism associated with tool failure. In one example, a machine learning data system comprises a data pre-processing module, a machine learning training module, and a predictive module. The pre-processing module analyzes dynamic sensor input to identify one or more vibration mechanisms associated with a downhole tool. The machine learning training module identifies a correlation between dynamic sensor data and failure data for a plurality of downhole tools. The predictive module correlates the one or more vibration mechanism with tool failure or performance.

20 Claims, 6 Drawing Sheets

(56) References Cited

U.S. PATENT DOCUMENTS

| | | |
|---|---|---|
| 2019/0277135 A1 | 9/2019 | Zha |
| 2020/0182684 A1 | 6/2020 | Yoskovitz et al. |
| 2021/0255913 A1* | 8/2021 | Singh .................... G06F 11/008 |
| 2023/0228897 A1* | 7/2023 | Thompson .......... E21B 43/2607 |

* cited by examiner

| Tool ID | Comp Stat | M9 | Cumulative Index | Total # of Runs |
|---------|-----------|-----|------------------|-----------------|
| 13476069 | CRACKED | YES | 79.31 | 1 |
| 13018878 | CRACKED | YES | 56.85 | 1 |
| 13476072 | CRACKED | YES | 44.72 | 2* |
| 12990496 | CRACKED | YES | 36.61 | 3 |
| 13035516 | CRACKED | YES | 34.45 | 2 |
| 13028238 | CRACKED | YES | 31.42 | 4 |
| 13018880 | CRACKED | YES | 26.46 | 3 |
| 13009034 | CRACKED | YES | 10.44 | 2* |
| 13035532 | CRACKED | YES | 8.79 | 2 |
| 13004675 | NOT CRACKED | NO | 1.57 | 2* |
| 13493553 | NOT CRACKED | NO | 1.53 | 1 |
| 13035520 | NOT CRACKED | NO | 0.1 | 1 |
| 13187170 | NOT CRACKED | NO | 0.1 | 1 |

| DDSrX | | | | | | | |
|-------|---|---|---|---|---|---|---|
| Freq start | Freq end | Min | Max | Avg | Stdev | Count(f) | Index |
| 0 | 5 | 0.08 | 0.7 | 0.43 | 0.19 | 16 | 31.8 |
| 5 | 10 | | | | | | |
| 10 | 15 | | | | | | |
| 15 | 20 | | | | | | |
| 20 | 35 | | | | | | |
| 35 | 50 | 0.06 | 0.06 | 0.06 | 0 | 1 | 0.05 |
| 50 | 100 | 0.12 | 0.34 | 0.19 | 0.1 | 4 | 2.32 |
| 100 | 225 | 0.06 | 0.15 | 0.09 | 0.04 | 4 | 0.29 |
| 225 | 350 | 0.05 | 0.28 | 0.12 | 0.09 | 6 | 2.9 |
| 350 | 475 | 0.05 | 0.73 | 0.2 | 0.24 | 7 | 6.75 |

| ABI RPM | | | | | | | |
|---|---|---|---|---|---|---|---|
| Freq start | Freq end | Min | Max | Avg | Stdev | Count(f) | Index |
| 0 | 5 | 0.89 | 57.99 | 8.41 | 16.71 | 15 | 630.82 |
| 5 | 10 | | | | | | |
| 10 | 15 | | | | | | |
| 15 | 20 | | | | | | |
| 20 | 35 | 0.05 | 0.12 | 0.08 | 0.03 | 13 | 4.68 |
| 35 | 50 | 0.14 | 0.47 | 0.24 | 0.09 | 16 | 17.98 |
| 50 | 100 | 0.05 | 1.56 | 0.28 | 0.32 | 21 | 22.85 |
| 100 | 225 | 0.06 | 0.13 | 0.09 | 0.02 | 16 | 6.23 |
| 225 | 350 | 0.05 | 0.24 | 0.11 | 0.05 | 19 | 10.21 |
| 350 | 475 | 0.06 | 4.88 | 1.47 | 1.47 | 21 | 80.01 |

USE OF VIBRATION INDEXES AS CLASSIFIERS FOR TOOL PERFORMANCE ASSESSMENT AND FAILURE DETECTION

BACKGROUND

Downhole tools used in drilling oil and gas wells are subjected to extreme environmental and operational parameters. A typical well may be drilled to a depth of several thousand feet into the earth, exposing tools to very high temperatures, pressures, and caustic fluids. Simultaneously, the forces encountered while drilling include large bending, tensile, compression, shear, and torsional forces, along with cyclical loading such as vibration, and complex dynamic patterns such as stick-slip. The downhole drilling environment therefore calls for robust tool design and an ability to effectively and efficiently manage a fleet of tools. The complexity of loading on a downhole tool and range of different formation types make it challenging to predict tool failure. This leads to an associated challenge of tool selection, particularly when an operator is given a range of prospective tool choices within a fleet.

BRIEF DESCRIPTION OF THE DRAWINGS

These drawings illustrate certain aspects of some of the embodiments of the present disclosure and should not be used to limit or define the method.

FIG. 4 is a chart of some example training data for multiple tool runs and tools.

FIG. 5 is a chart providing an example of data pre-processing for a lateral vibration input.

DETAILED DESCRIPTION

Disclosed herein are systems and methods for establishing correlations between tool performance and tool failures to specific vibration mechanisms that the tools are exposed to during a downhole (DH) operation. This allows for fleet management, such as by using machine learning analytics to monitor tool health to predict and avoid tool failure, for proactively maintaining tools, and for assigning tools to jobs that are expected to meet performance requirements for those jobs. Various mechanism are identified that may be associated with tool failure or performance degradation. Vibration mechanisms are discussed extensively below by way of example, as identified by this disclosure as having a significant effect on downhole tools performance. Other mechanisms can be correlated in the same way and are also in the scope of this disclosure, non-limiting examples of which include chemical exposure, chemical-mechanical interactions, and so forth. Numerical vibration indexes may be established related to the vibration or other mechanism. Tool health may then be monitored by tracking a cumulative vibration index for the identified vibration mechanisms. The disclosed systems and methods may also help identify design/build process weaknesses for continuous improvement, and to implement design of service enhancements.

One or more embodiments may involve cumulative indexes for different vibration mechanisms utilizing vibration data from vibration sensors and other sensor packages (e.g., magnetometers, accelerometers, gyroscopes) used during downhole operations. Master datasets may be generated for the tools in the fleet, including vibration mechanism cumulative indexes, performance measurements, and tool health status. Correlations or transfer functions may be established between vibration indexes and tool failures or downhole performance metrics. Correlation generally refers to a statistical model, whereas transfer function generally relates to a deterministic model. Typically, a transfer function is applied first, if possible, then a correlation is applied. The vibration indexes may be used as classifiers to predict the impact on tool failure or downhole performance metrics, optionally in real time, and engage mitigation action such as maintenance or real-time adjustment of drilling parameters. Post run, these indexes could be used for accurate asset disposition for tools in the fleet.

Figure 1:
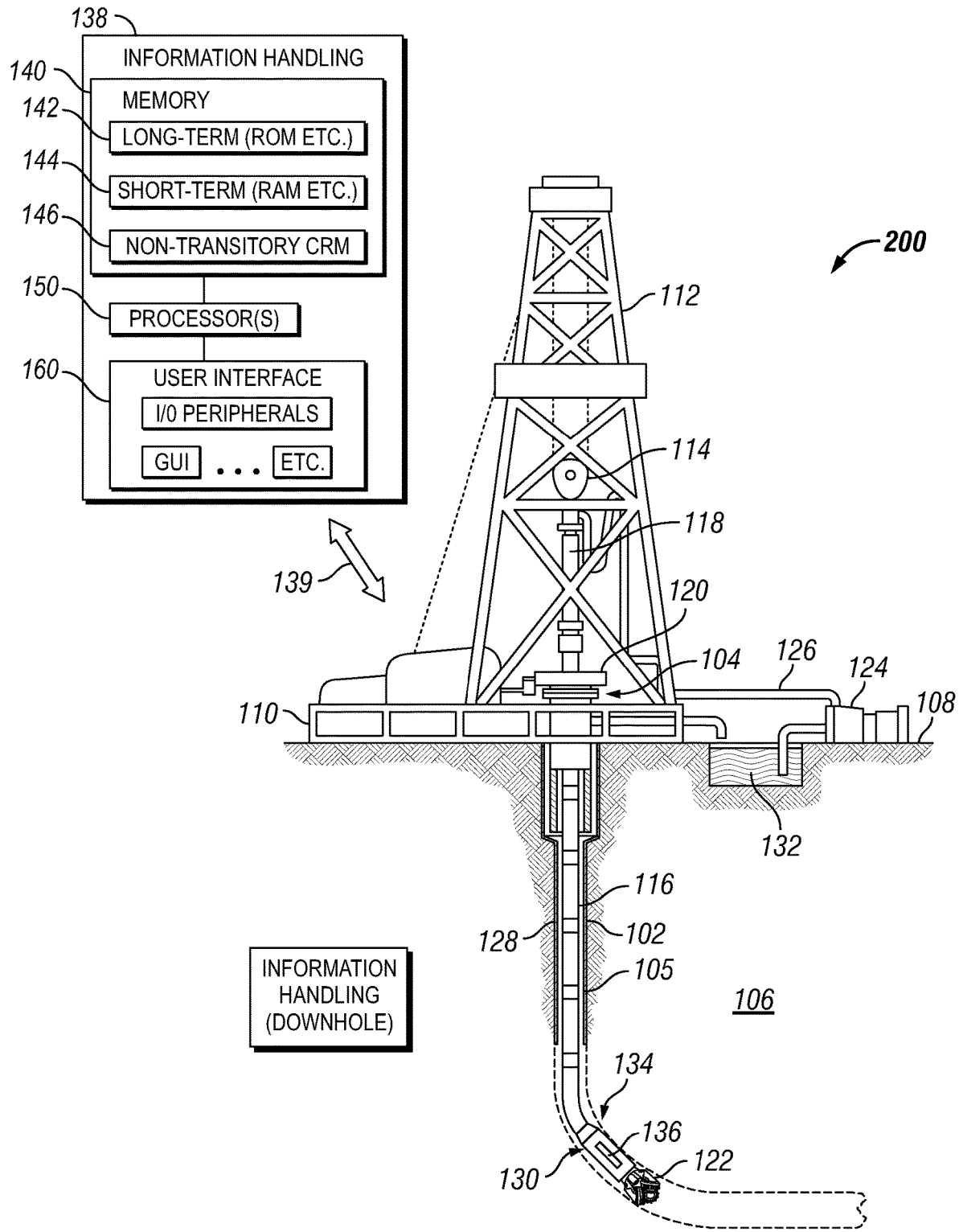
FIG. 1 is a schematic diagram of a drilling system for implementing vibration-related failure analysis and mitigation for a downhole tool according to the disclosure.

FIG. 1 is a schematic diagram of a drilling system 100 for implementing vibration-related failure analysis and mitigation for a downhole tool according to the disclosure. Generally, the downhole tool could be any tool that may experience vibrations as a result of its operation downhole. Vibration in this context comprise any cyclical, repetitive motion in any of one or more axes of freedom. The downhole tool in this example comprises a rotary steerable tool (RSS) 130 used in a bottom hole assembly (BHA) 134 to provide directional control while drilling a wellbore 102 from the surface 108 of the well site down into a subterranean formation 106. For example, the RSS 130 may be a "push the bit" type system that uses coordinated movement of pad pushers against the wellbore 102 to urge a drill bit 122 in a particular direction. Alternatively, the RSS 130 may be a "point the bit" type system that can adjust the orientation of a drill bit axis relative a body of the RSS 130 in order to point the drill bit 122 in the desired direction. Directional drilling may result in any number of horizontal, vertical, slanted, curved, and other types of wellbore geometries and orientations to achieve a desired wellbore path. After drilling the wellbore 102, portions of the wellbore 102 may be lined with a tubular, metallic structure referred to as a casing 105. Although certain drawing features of FIG. 1 depict a land-based oil and gas rig, it will be appreciated that the embodiments of the present disclosure are useful with other types of rigs, such as offshore platforms or floating rigs used for subsea wells, and in any other geographical location. For example, in a subsea context, the surface 108 may represent the floor of a seabed, and the rig floor may represent an offshore platform or floating rig over the water above the seabed.

The well site includes a drilling platform 110 with a support structure such as a derrick 112 erected over a wellhead 104 at the surface 108 of the well site. The derrick 112 or other support structure may include equipment for raising and lowering the drill string 116 and other tool strings using in constructing, operating, and maintaining the well. This equipment may include a traveling block 114 used for raising and lowering the drill string 116 while drilling and a kelly 118 to support the drill string 116 as it is lowered through a rotary table 120. The drill string 116 comprises the BHA 134 (which includes the RSS 130) and a tubular conveyance extending from the surface 108 down into the wellbore 104. The tubular conveyance supports the weight of the BHA 134 for raising and lowering into the well and provides fluid and/or electrical communication between the tools and surface 108. In this example the tubular conveyance comprises a long string of drill pipe segments that may be progressively added at the surface 108 throughout drilling operations in order to reach a desired depth. A pump 124 may circulate drilling fluid (i.e., mud) from a retention pit 132, through a feed pipe 126, downhole through the drill string 116, out through nozzles in a drill bit 122, and back to the surface 108 via an annulus 128 surrounding drill string 116. Rotation of the drill bit 122 may be driven by rotation of the entire drill string 116 from surface 108 and/or by rotation of a downhole motor.

Drilling, particularly when using an RSS 130, introduces complex dynamics into the drill string 116. Even in a relatively simple scenario of drilling a straight wellbore section, a downhole force is applied axially during drilling, referred to as weight on bit (WOB), while a drill bit is simultaneously rotated at certain revolutions per minute (RPM) to cut the formation. Torque may be applied to the drill string in the desired rotational direction while the drill bit and portions of the drill string encounter competing frictional forces against the wellbore 102. Unpredictable or sporadic torsional behavior may result from this interaction, such as stick-slip. The drill string 116 is constrained to follow the deviated wellbore path drilled using the RSS 130, which introduces further uncertainty into the dynamic behavior of the drill string 116. The RSS 130 itself introduces further complexity. For example, in a push-the-bit system, pad pushers are forcefully engaging the wellbore 102 to urge the drill bit 122 in a lateral direction. The movement of the pad pushers is precisely coordinated to bias in a particular direction. The RSS 130 in some systems may also have a counter-rotating housing to remain geostationary while drilling. It can be appreciated that this combination of forces and dynamics while drilling cannot always be fully described with a conventional physics model.

An aspect of this disclosure is the identification of a relationship between vibrations in the drill string 102 and the performance and longevity of well tools. Vibrations in the RSS 130 may result from one or more different vibration mechanism (VM), optionally in addition to other mechanism(s). A vibration mechanism according to this disclosure may directly relate to a specific or discrete vibration source or combination of vibration sources. For example, vibration mechanisms may include oscillating motions in any axis of freedom, including but not limited to individual torsional, axial, or lateral vibration components identifiable from sensor data. The vibration mechanisms may also include certain vibrational patterns or phenomenon resulting from the complex dynamics of drilling and which may have multiple contributing factors. As a non-limiting example, such other vibration mechanisms may include so-called stick-slip, which is generally a cyclical pattern whereby a portion of the drill string is temporarily stuck until a drill string torque overcomes friction and the torsional energy is released. Moreover, a tool or a portion of tool typically has natural resonant frequencies. When operating close to those resonant frequencies, vibration damage could be much worse, as compared to other vibration frequencies that may be associated with regular wear and tear on a tool. Stick-slip motion, in particular, is an example of a sudden motion change in time domain, which creates wide frequency spectrum, but frequencies are on the low side. High frequency torsional vibration is another candidate for potential tool damage.

The RSS 130 and other components of the BHA 134 may comprise any number of sensors schematically depicted at 136, with transmitters and/or receivers for communicating the collected data. The BHA 134, for example, may include a measurement-while drilling (MWD) system for gathering sensor data used to guide drilling and/or a logging-while-drilling (LWD) system to gather information about the formation being drilled. The sensors 136 may include any of a variety of dynamic sensors, including but not limited to one or more gyroscopes (i.e., gyros), accelerometers, magnetometers, speed sensors, position sensors, and vibration sensors. A gyroscopes, alternately referred to as a "gyro," is a device that measures rotational motion. Gyros may be implemented, for example, as MEMS (microelectromechanical system) that measure angular velocity. The units of angular velocity are measured in degrees per second or revolutions per second (RPS). A magnetometer is a scientific instrument that measures the strength and/or direction of a magnetic field. Typically, magnetometers measure a magnetic field or flux density in metric units of gauss (G) or the international system (IS) unit tesla (T). An accelerometer is a sensor that measures acceleration, which is the change in speed (velocity) per unit time. Measuring acceleration makes it possible to obtain information such as object inclination and vibration, force, torque etc. Magnetometers can tell tool inclination and rotating speed. Derivative of rotation speed from gyros and magnetometers can be used for angular acceleration, thus torque and force.

Sensors may also be included for measuring downhole parameters, such as pressure, temperature, and chemical analysis. The sensors may include vibration sensors that directly sense vibration. Alternatively, signals from the various dynamic sensors (e.g., gyroscope, accelerometer, and magnetometer) may be analyzed to identify vibrations.

An information handling system 138 in direct or indirect communication with the BHA 134 may be used to gather, store, process, communicate, and analyze the data from the sensors and other inputs and optionally to control the RSS 130 or other BHA components. The information handling system 138 may include various spatially separated components, which may include various above-ground components (e.g. at a surface of the well site and/or a remote location) and/or below-ground components, such as a downhole information handling subsystem 138A. Such distributed or spatially separated components may be connected over a network or other suitable electronic communication medium. Thus, processing, storing, and/or analyzing of information may occur at different locations and times, and may occur partially downhole, partially at the surface 108 of the well site, and/or partially at a remote location, such as another well site or a remote data processing center. Sensor data and other information processed downhole may be transmitted to surface 108 to be recorded, observed, and/or further analyzed at the surface or remote site. Additionally, information recorded on information handling system 138 that may be disposed downhole may be stored until RSS 130 may be brought to surface 108. In some examples, the information handling system 138 may communicate with the RSS 130 through a telemetry system (e.g., mud pulse, magnetic, acoustic, wired pipe, or combinations thereof) in real-time mode. The information handling system 138 may transmit information to the RSS 130 or BHA 134 and may receive as well as process information recorded by RSS 130 or BHA 134.

Generally, components of the information handling system 138 may include memory 140, one or more processor 150, and a user interface 160. Memory 140 may comprise any of a variety of electronic memory devices, such as one or more long-term storage device 142, one or more short-term storage device 144, and a non-transitory computer-readable medium (CRM) 146. Long-term memory may be structured, for example, as read only memory (ROM), which is a type of non-volatile memory for which data is not readily modified after the manufacture of the memory device. Short-term memory 144 may be structured, for example, as random access memory (RAM), which in contrast to ROM or Flash, can be read and changed. For example, short-term memory may be used to temporarily store information such as computer executable instruction code (e.g., from software) and/or data from sensors 136 for processing by a processor 150. The non-transitory CRM 146 may comprise a device or structure on which computer executable instructions, data, and other information may be stored in a non-transitory manner. The user interface 160 generally comprises one or more devices electronically connected or connectable to other components of the information handling system 138 for communicating information from or to a user (typically, a human user). The user interface 160 may include input/output (I/O) peripherals 162. Examples of peripherals for user input include a keyboard, mouse, stylus, track pad, touchscreen, smart goggles or glasses, a microphone, and biometric (e.g. fingerprint, retina, or facial recognition) sensors. Examples of peripherals that provide output for a user include a video display, a speaker, a printer or other imaging device, a tactile feedback device, and smart goggles or glasses. Some of these peripherals provide both user input and user output.

The processor 150 may include a microprocessor or other suitable circuitry for processing information, such as for estimating, receiving and processing signals from the RSS 130 or other BHA components. The RSS 130 or information handling system may also include one or more additional components, such as analog-to-digital converter, filter and amplifier, among others, that may be used to process the measurements of the RSS 130 before they may be transmitted to surface 108. Alternatively, raw measurements from RSS 130 may be transmitted to surface 108.

Any suitable technique may be used for transmitting signals from RSS 130 to surface 108, including, but not limited to available telemetry e.g., mud pulse, magnetic, acoustic, wired pipe, or combinations thereof). While not illustrated, RSS 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 139, which may be a wired or wireless link. The telemetry data may be analyzed and processed by information handling system 138. A communication link 140 (which may be wired or wireless, for example) may be provided that may transmit data from the RSS 130 or downhole information handling subsystem 138A to components of the information handling system 138 at surface 108.

The information handling system 138 described above thus represents any of a broad range of different configurations. The information handling system 138, in any of its configurations, may be used in performing all or part of the methods and controlling all or part of the systems further described herein for implementing vibration failure analysis and mitigation. For example, the information handling system 138 may be used to process data from the sensors 136 and other inputs to analyze vibration and correlate vibration with tool failure and/or tool health. The correlations may then be used to guide decisions on tools in a tool fleet (in this example, a fleet of RSS tools) in terms of identifying or predicting failure, scheduling maintenance for tools, selecting tools for a job, and in some cases, in real-time vibration mitigation.

Figure 2:
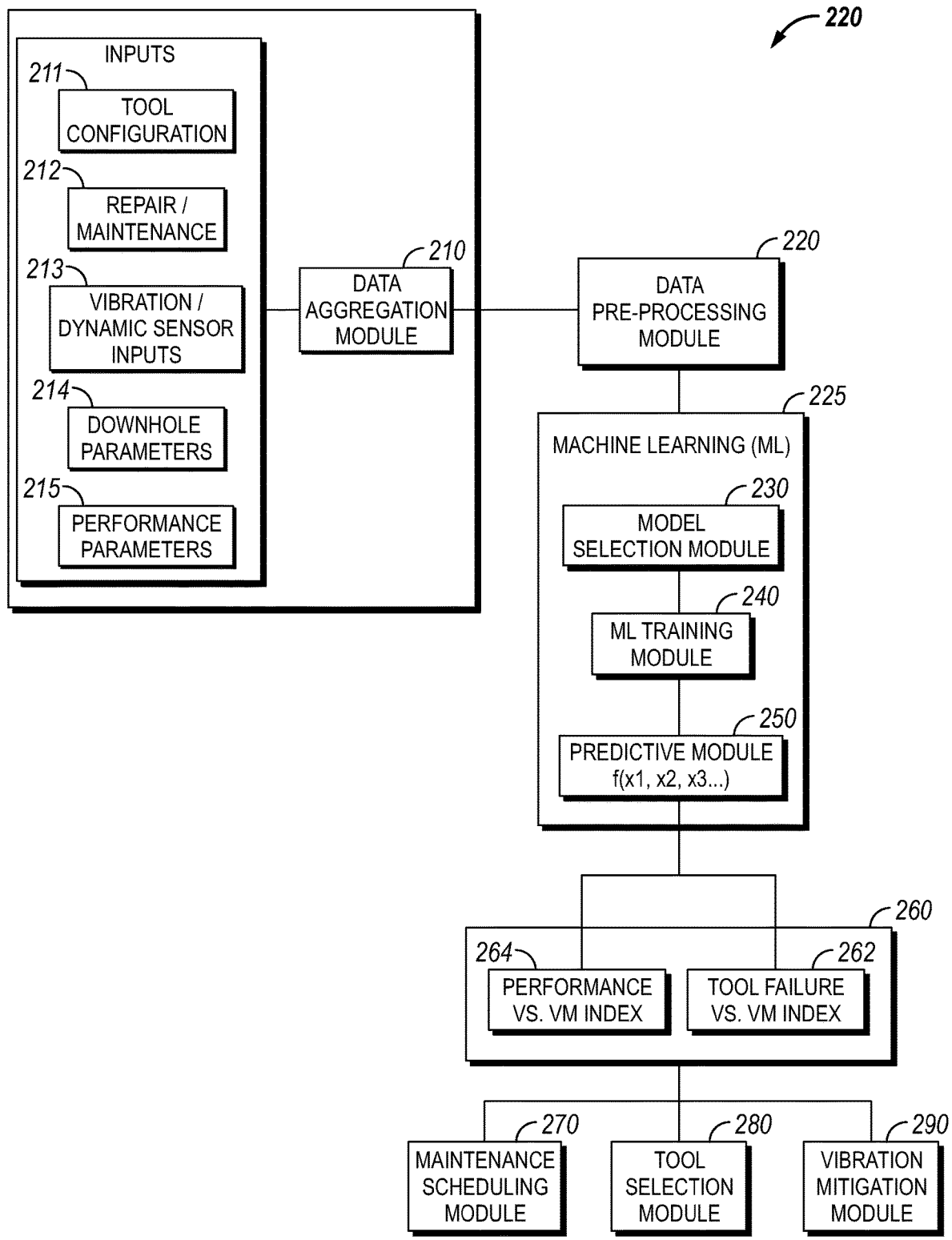
FIG. 2 is a block diagram of an example of a machine learning data system for predictive tool failure and performance analysis according to certain aspects of the disclosure.

FIG. 2 is a block diagram of an example of a machine learning data system 200 for predictive tool failure and performance analysis according to certain aspects of the disclosure. The system 200 may be used to analyze the RSS 130 of FIG. 1, for example. The block diagram is organized as a set of interrelated modules describing functions that are performed largely, if not exclusively, using one or more computer system and related machines. As such, the block diagram and the various modules are may be, to some extent, simplified to convey functional aspects and possible process flows without necessarily limiting the overall machine learning data system 200 to a particular, immutable structure in terms of hardware or software components, nor to a discrete, immutable sequence of steps. Thus, not all of the depicted components may be required, and one or more implementations may include additional components not shown in the figure. Certain functionality described with respect to one module may in some cases be shared by one or more modules. Variations in the arrangement and type of the components may also be made without departing from the spirit or scope of the claims as set forth herein.

The machine learning data system 200 includes various data or information inputs 211-215, a data aggregation module 210 for aggregating the various data inputs 211-215, a data pre-processing module 220 for processing data from the data inputs, a model selection module 230, a machine learning (ML) training module 240, and a predictive module 250. The predictive module 250 may result in different types of correlations 260 based on different vibration mechanisms, such as a failure type correlation 262 or a performance type correlation 264. The output of the machine learning data system 200 can inform action-based modules, such as a maintenance scheduling module 270, a tool selection module 280, and/or a vibration mitigation module 290.

As an overview, the machine learning data system 200 may be used for building a machine learning model that utilizes various historical data for a plurality (e.g., one or more fleets) of RSS or other drilling tools, accumulated over a plurality of runs, and at least partially based on vibration data directly or indirectly obtained from tool sensors. The data may include data from dynamic sensors such as gyroscopes, magnetometers, and accelerometers, and other sensors above, along with tool configuration parameters, performance parameters, drilling conditions, geology of the field where the RSS was used, and other data about the tool's history that may be relevant to its current tool health and probability of failure. The machine learning model can be used for predicting or confirming needed tool repairs or maintenance, tool selection from among existing tools in a fleet or additional tools, tool design and reliability improvement, and in some cases for vibration mitigation through real-time process changes or planned future design changes.

Typically, traditional analysis techniques are based only on applied physics or other engineering fundamentals, such as finite element analysis used for predicting failure. However, the complex dynamics of some tools, particularly rotary steerable tools, along with their potential for use in a wide variety of downhole environments around the world, and a myriad of different custom well plans, renders traditional analysis techniques insufficient or impractical to fully assess and predict tool failure. Traditional techniques may, for example, require design of experiments, which only work with continuous data, and potentially require different models to be created for each tool design, resulting in a very time intensive and complex process.

The data aggregation module 210 is used to aggregate (e.g., collect, compile, store, sort, and/or otherwise manage and maintain) data from a plurality of tools over a plurality of tool runs. The tools may be of a particular type, such as a particular model of an RSS in a fleet. A job and a tool run are related in that each tool run may be the event of a selected tool performing a selected task or job. For example, one tool run for any RSS may comprise deploying the RSS on a drill string to drill a planned wellbore or portion of a wellbore. After a particular tool run, the RSS may be removed such as for inspection, maintenance, and preparation for a future run. Data associated with tool run may be stored and/or communicated in real time for analysis. The aggregated data from multiple tools and tool runs may be used to build a machine learning model. The data may be merged into a large and dynamically updated dataset (e.g., a data lake) from a plurality of tool runs and tools around the world that can serve as input variables to build the machine learning model and dynamically update the machine learning model over time as more data is aggregated. In some implementations, the data aggregation module 210 is communicatively coupled to the different sources through individual application programming interfaces (APIs). The different sources of data/information include, but are not limited to, tool configuration data 211, repair/maintenance data 212, vibration and other dynamic sensor data 213, downhole parameters 214, and performance parameters 215.

Tool configuration data 211 may relate to tool configuration options for otherwise identical, similar, or comparable tools. The system 200 is generally used to analyze tools of the same type or design such that useful correlations can be made that are primarily attributable to differences in tool histories rather than design differences between the tools themselves. However, the tool configuration data 211 may be useful for a fleet of tools having the same overall design, configuration, or type, but with a limited number of configuration options that may have some correlation with other parameters in tool performance or failure. For example, the analysis may be applied to a fleet of RSS tools all having the same overall push-the-bit steering mechanism, but with limited number of configuration options such as motor type, collar type, inclusion of particular tool subs (e.g., flex subs), tool or component revisions.

The repair and maintenance data 212 may be used to track the individual service histories of tools in a fleet. Typically, tools in a fleet require ongoing maintenance. As further discussed below, the system 200 may be used to evaluate the cumulative effect of each run on a tool's health or next failure or maintenance event. Thus, the service history is useful to track in terms of predicting when a next failure or maintenance event may occur. The repair and maintenance data 212 may include a historical distribution of repairs made to the individual RSS components including the frequency of certain types of repairs made.

The vibration and other dynamic sensor data 213 is gathered from various downhole sensors while drilling. Vibration data has been identified according to this disclosure as being one of the most significant parameters affecting tool performance and failure. The vibration data can initially be gathered in a "raw" format as reported by a vibration sensor. For example, imaging tools (resistivity and acoustic) and nuclear magnetic resonance (NMR) tools are very sensitive to motion, and therefore, motion information can be extracted from those measurement Vibration data may also be determined by analysis of data from other dynamic sensors such as gyroscopes, magnetometers, and accelerometers included with the RSS or with the BHA generally. For example, vibration may be obtained directly from a vibration sensor, or indirectly by analysis of dynamic data from one or more gyroscope, magnetometer, accelerometer, or other dynamic sensors. The vibration data 213 may be stored in some raw or intermediate format, for later pre-processing for use by the ML model as described below.

Downhole parameters 214 are data that may describe information about the downhole environment, which may be gathered by sensors in the BHA or RSS, but is not specific to the RSS tool itself. The downhole parameters 214 may include temperature and pressure, for example. The downhole parameters may also include formation data such as the lithology of one or more subterranean formations being drilled or the chemistry of fluids and other substances with which the RSS is exposed to.

The performance parameters 215 is a dataset that includes the operating conditions during drilling, such as the total length of the drilled wellbore during a particular tool run, weight-on-bit (WOB) information, rotational information such as revolutions-per-minute (RPM), rate-of-penetration (ROP) data, and dogleg severity (DLS). These parameters may be determined, at least in part, by some of the same sensors used for other parameters, such as the dynamic sensors used in determining vibration. These are parameters that may be reported to the operator/driller in terms of controlling the drilling process separate from the predictive analysis provided by the ML data system 200. However, these performance parameters 215 may also be saved and used as one of the many inputs to be correlated by the ML data system 200 along with vibration data.

The data aggregation module 210 may aggregate all of the foregoing data or information inputs 211-215 from any of a plurality of sources for a plurality of tools and tool runs. The data aggregation module 210 may therefore represent, in one respect, intermediate data stores from many tools over the course of many tool runs, such as data initially collected and temporarily stored on individual tools, which may then be communicated to one or more site-specific information handling systems, and eventually copied to or made accessible by a central information handling system used to perform the machine learning methods. Alternatively, the data aggregation module 210 may represent a destination repository of such previously gathered data located on the specific information handling system used to perform the machine learning methods.

The data pre-processing module 220 is optionally configured to pre-process the data from the data aggregation module 210 such as to put it in a better form or sub-select specific data for analysis by the machine learning module. This may include a preliminary step of cleaning up the data, such as removing outliers and data with missing values. For example, the data pre-processing module 220 may utilize one or more filtering algorithms to remove one or more data points that exceed a predetermined threshold and/or reside outside a predetermined cluster of data points by a measured amount. The data pre-processing module 220 may also be used to analyze the raw vibration data to determine various vibration mechanisms having a positive correlation with tool health/failure. The data pre-processing module 220 may perform analyses to identify problem frequencies that have a particularly strong correlation with tool failure. For example, the module 220 may be used to perform one or more Fourier transform analysis, such as a fast Fourier transform (FFT) analysis on a time-domain signal for each sensor signal input.

The model selection module 230 is configured to select among several classes of machine learning models. If the user objective is to gain visual insight about decision making, the model selection module 230 selects a decision tree model. If the user objective is to use results for optimization, the model selection module 230 selects a deep learning based model. The model selection module 230 may receive user input indicating the user objective. The user input may be received concurrently with the dataset from the data aggregation module 210 through the data pre-processing module 220 in some implementations, or the user input may be received independently via a user interface to the machine learning data system 200.

The ML training module 230 is configured to apply the selected model(s) to train the system 200 based on vibration and other dynamic data from the plurality of tools and tool runs. The ML training module 230 receives all input variables from the pre-processing module 220 that can be used to build a data driven model. The machine learning based model may identify correlations between vibration data and tool performance and health to proactively guide management of a tool fleet by the system 200. The ML training module 230 may utilize at least a portion of input variables from the pre-processing module 220 to train the machine learning based model. The training may be performed with a feedforward network, where each of the input variables is assigned to a weighted classification. The machine learning based model may be a neural network such as a deep learning model. In some aspects, the neural network may be a convolutional neural network. The neural network may include multiple layers (e.g., input layer, hidden layers, output layer) including a back propagation layer. The ML training module 230 is configured to generate the machine learning based model for classification, clustering, and/or predictive analytics by regression.

The predictive module 250 is configured to correlate vibration mechanisms and other inputs associated with the RSS or other drilling tool and their impact on tool health using the machine learning based model(s) applied during training. The vibration mechanisms and particular problem frequencies can provide insight into what drilling conditions and design specifications have the most impact on tool life and performance and how changes to those parameters can optimize repair costs. In one or more embodiments, the predictive module may identify a function $f(x1, x2, x3, \ldots)$, where x1, x2, x3 are parameters and may include, for example, accelerometer, gyroscope, and magnetometer amplitudes associated with different frequencies, and $f$ is the result of training performed by the ML training module 240.

Applying this function, a vibration index (VI) may be computed for each drilling job as a result of all vibration inputs. A cumulative index (CI) may be determined as the combination of vibration index values across multiple tool runs performed by a particular tool. The combination of indexes from individual runs may comprise a summation of those indexes. The CI may be, for example, a summation of individual index values over a plurality of tool runs. The CI may be, more particularly, a summation of individual index values over a plurality of tool runs for a particular frequency bin, or for a particular frequency bin and magnitude within that frequency bin. When using in prediction, the vibration index of an incoming job may be estimated by analyzing a description of the job to be performed and selecting a vibration index associated with a job which is very similar. This similarity may be determined, for example, in terms of aspects such as tool configuration, formation, or downhole environment. For example, a vibration index may be selected that was determined from a similar formation (geology, mud type, etc.), a similar tool string configuration, or similar tool operations (e.g., RPM, ROP, maximum dogleg, etc.) The value of the vibration index (single job) or the cumulative index may be compared with numerical thresholds determined through training, as an indicator of tool health. For example, one or more threshold may be identified below which tool failure is improbable and above which failure is probable within a certain degree of certainty.

The predictive module 250 may be used to obtain various correlations 260 as a function of vibration index. For example, a tool failure correlation 262 may be used to correlate the various indexes with tool failure. This tool failure correlation 262 may be useful, for example, to predict or avoid a next failure, or to select a tool from among a plurality of tool choices that, based on the selected tool's cumulative index, is expected to best survive a next job before the next repair or maintenance. The tool performance correlation 262 may be used to correlate the various indexes with tool performance. For example, a tool's performance may generally decline with successive jobs and require occasional repairs or maintenance to maintain a certain desired performance level. The tool performance correlation 262 may therefore be used to determine which tool(s) will achieve the desired performance for a given job based on the tools' cumulative indexes, as well as other factors like the tool's associated repair/maintenance 212.

The various action-based modules 270, 280, 290 may be based on one or more of the correlations 260. For example, the maintenance scheduling module 270 may predict which tools require maintenance, based on their cumulative indexes to date and/or their hypothetical vibration index for a next run. The maintenance scheduling module may then generate a recommended repair action, which may include a machine-recommended or user-selected repair schedule for performing one or more repair actions. The maintenance scheduling module 270 may also be configured to receive various user input indicating one or more calendar rules that are integrated with one or more repair type values from the repair type prediction to limit the repair schedule to a desired timeframe.

The tool selection module 280 may be a data driven model used in decision making to choose the best tool from among a list of available tool choices for a next job. For example, the tool selection module 280 may compare the cumulative index of each of a plurality of tools to the expected vibration index for the respective tools on a next run, and select (or indicate a preference for) the tool that is best for the job. For example, the tool selection module 280 may reference the tool failure correlation 262 to predict which tool(s) have the best chance to complete a next job without failure and/or the tool performance correlation 264 to predict which tool(s) will satisfy the performance objectives for the next job. The tool selection module 280 may provide a representation of one or more tool candidate selections for display. The tool selection module 280 may be configured to receive user input indicating a user selection of a tool in response to a display representation of the candidate tools.

The vibration mitigation module 290 may be used, in one or more embodiments, to perform real-time vibration mitigation. In one or more embodiments, the system 200 may be used to inform the drilling system 100 to dynamically adjust one or more system parameters that the drilling system 100 is capable of adjusting, optionally in real time. The system parameters may be anything that the system 200 is capable of adjusting. In some cases, the adjustments are performed in response to identifying that a threshold for a problem frequency will otherwise by exceeded. More generally, the adjustment may also be made to help prolong tool life or manage system health, even if performance is temporarily reduced. System parameters in this context may include certain controllable downhole parameters 214 or performance parameters 215 but is not limited to those categories. Non-limiting examples of system parameters include weight on bit (WOB), revolutions per minute (RPM) of the drill bit or RSS, and the dogleg severity (DLS) or other steering related parameter, whereby adjustment (typically, a reduction) of those parameters may extend tool life, if even just to help ensure completion of a current job. The vibration mitigation module 290 may be applied, for example, to minimize wear during a given job and/or increase the drilling performance of the tool based on the selected correlation(s) 260.

Figure 3A:
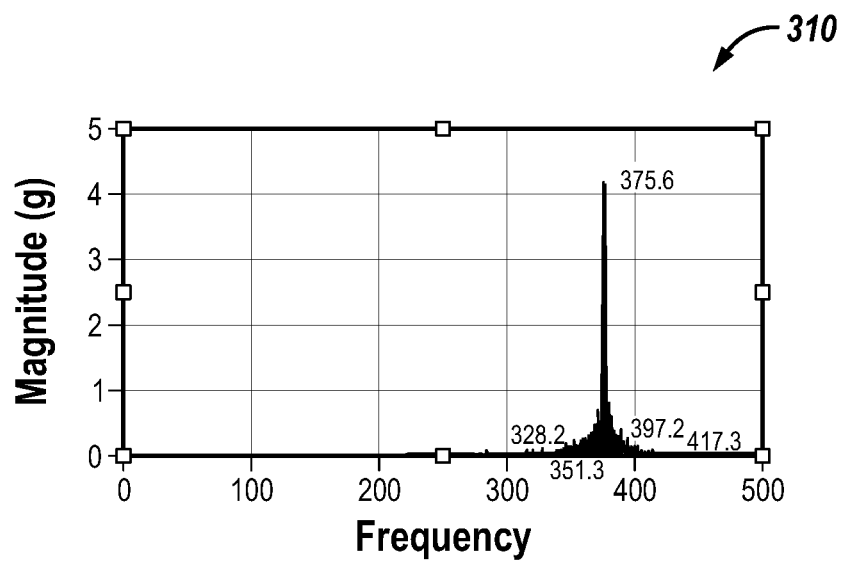
FIGS. 3A-3C are examples FFT plots for respective tools and tool runs, identifying a problem frequency associated with one of the vibration inputs.
Figure 3B:
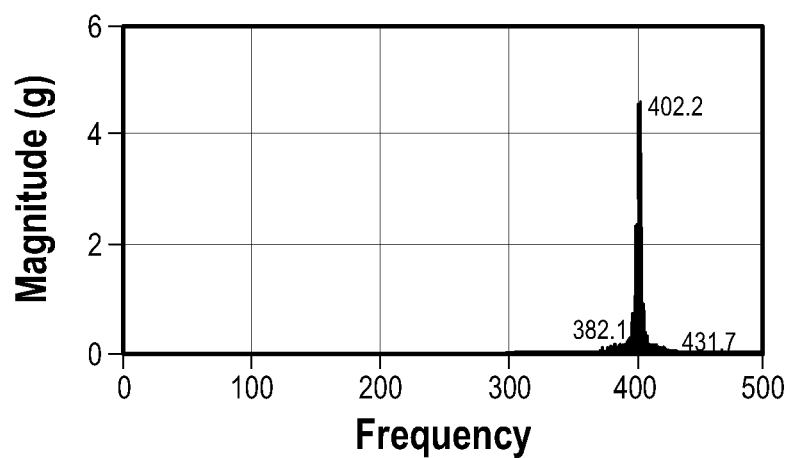
Figure 3C:
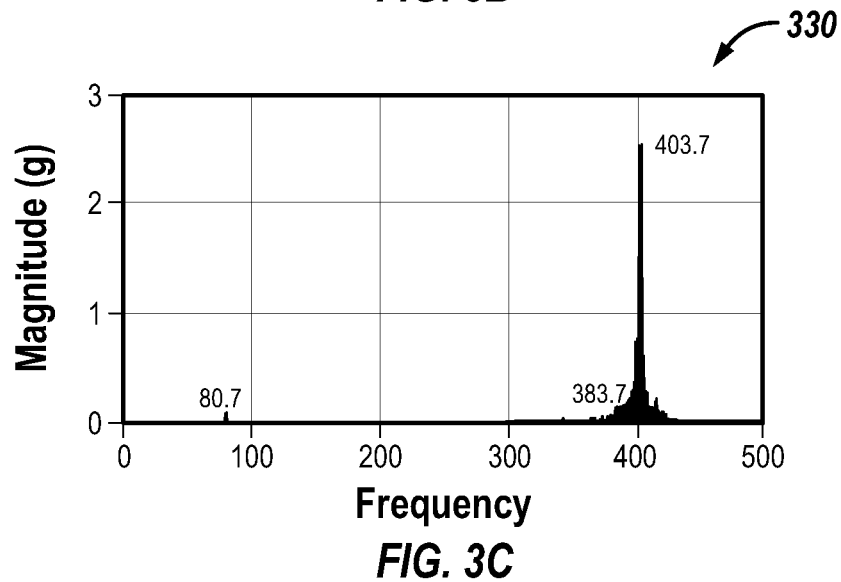

FIGS. 3A-3C are examples FFT plots 310, 320, 330 for respective tools and tool runs, identifying a particular problem frequency associated with one of the vibration inputs. In each FIG. 3A-3C, the horizontal axis represents frequency and the vertical axis represents magnitude at that frequency. To obtain the FFT plots, a Fourier transform (e.g., a fast Fourier transform or FFT) is applied to one or more dynamic sensor signal inputs to convert the signal from the time domain to the frequency domain. The particular signal input in this case is a gyroscope. The frequency domain reveals a particularly large amplitude at around 400 Hz. The actual numerical value differs slightly (e.g. 375 in FIG. 3A vs. 402 in FIG. 3B) based on slight actual differences between tools. For instance, all three tools may have the same overall design but with slightly different resonant frequencies due to differences attributable to manufacturing tolerances and wear. All three tools exhibited a failure and have the associated problem frequency. It has been determined that a high failure rate will occur at this particular problem frequency and amplitude. This analysis and identification of problem frequencies is an example of pre-processing steps that may be performed by the pre-processing module 220 of FIG. 2.

FIG. 4 is a chart of some example training data for multiple tool runs and tools. Each tool has a unique Tool ID in Col. 401 1. The failure status of a particular component is identified in a "Component Stat" Col. 402, where cracked represents a part failure due to cracking. Col. 403 identifies a particular vibration mechanism "M9" which may be identified by some mathematical analysis of some combination of vibration inputs, such as in a pre-processing module. For example, M9 may indicate presence of an identified problem frequency above a certain magnitude threshold. M9 is an example of a vibration signal amplitude that the tool component is very sensitive to. Column 404 is the Cumulative Index for the respective tool in that row identified in Column 401. Column 405 identifies the total number of tool runs the respective tool has been used on. This data sample illustrates that tools with a cumulative index value of greater than around 8 are likely to have failed (cracked), whereas tools with a cumulative index of less than around 8 are unlikely to have failed. In all cases where failure has occurred, the presence of M9 has been detected.

FIG. 5 is a chart providing an example of data pre-processing for a lateral vibration input "DDSrX." The frequency spectrum under analysis is organized into frequencies bins with lower and upper limits set forth in Columns 501 and 502 of each row. The frequencies bins in this case are contiguous bins. For example a first row 511 analyzes frequency response for a frequency bin (or sub-range) of between 0 and 5 Hz; a second row 512 analyzes frequency response for another frequency bin of between 5 and 10 Hz, and so on. Although this example uses contiguous frequency bins, overlapping frequency bins may also be used if desired, such as to analyze different bandwidths of frequency. Various mathematical operations (statistical analysis) are tabulated in Columns 503 to 506. In this table, DDSr data is measurement in bursts. Every burst lasts for certain amount of time, for example 5 seconds. Each burst data is FFT-analyzed. The number of bursts having a frequency in a particular bin is called a counts, as indicated in a "count" Column 507. A vibration index is set forth in Column 508, providing total vibration energy experienced in corresponding frequency interval. The data and calculations presented in this table are understood to be exemplary and non-exhaustive.

Figures 6, 7:
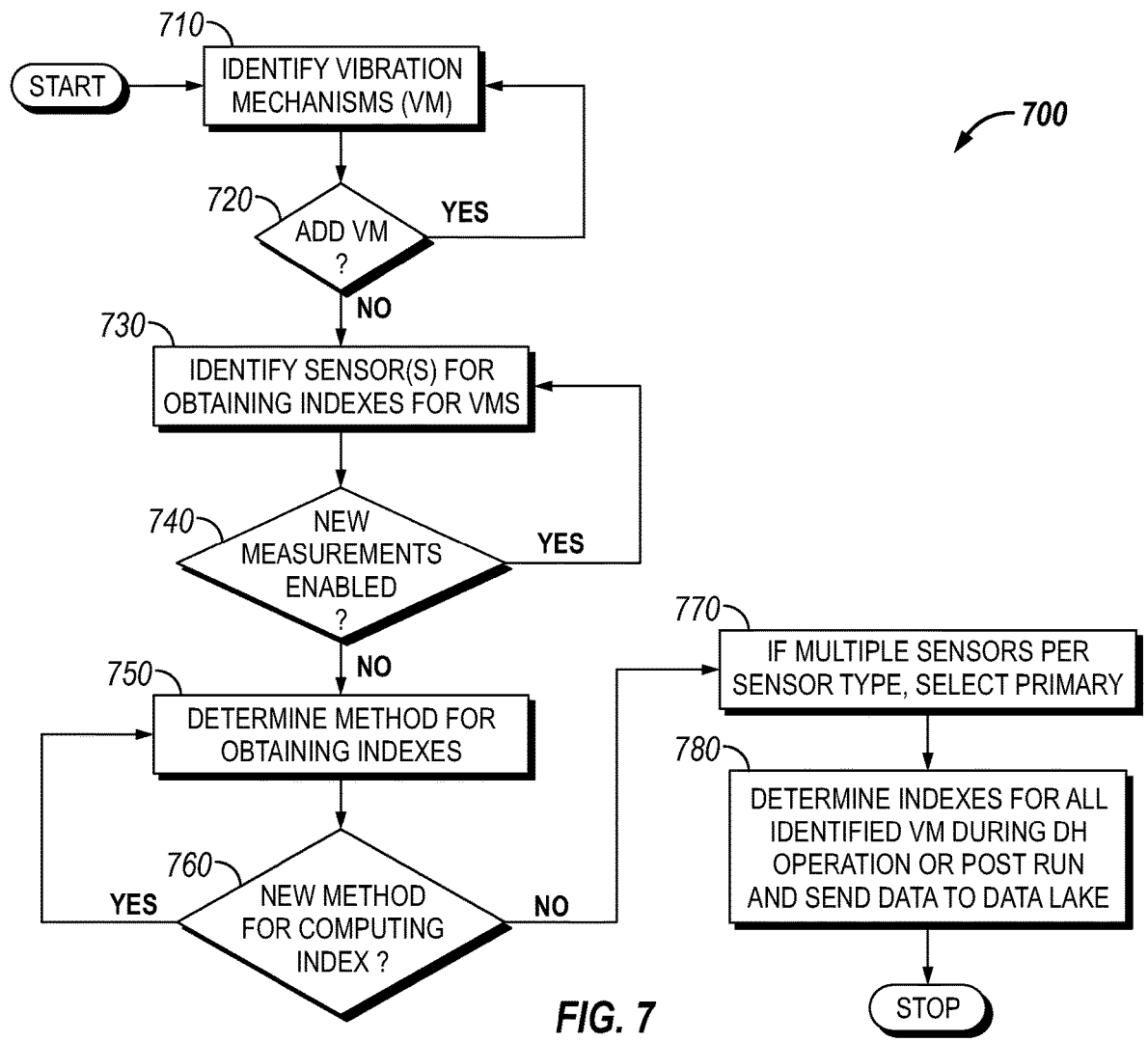
FIG. 6 is a chart providing an example of data pre-processing for a torsional vibration input.
FIG. 7 is a flowchart of an example workflow for determining vibration indexes for a downhole operation.

FIG. 6 is a chart providing an example of data pre-processing for another vibration input, which in this case is a torsional oscillation input "ABI RPM." The rows are similarly organized into frequency bins and provide various statistical operations and culminate in an Index Column 608. As can be seen in both charts of FIGS. 5-6, different frequency bins are attributable to different index values.

FIG. 7 is a flowchart 700 of an example workflow for determining vibration indexes for a downhole operation. Step 710 involves identifying an initial set of one or more vibration mechanism that may have a correlation with failure. Step 710 may be performed, for example, when a new tool design or a significant design change to an existing tool design is established. Identification of a vibration mechanism may involve an analysis of vibration data from one or more tool runs, such as either commercial tool runs and/or test runs, and which may serve as an initial training data set. In some cases analysis of vibration data involves analyzing a signal from one or more dynamic sensors, such as rotational or lateral (x, y, z) signal data to identify particular frequencies and magnitudes associated with failure rates. For example, the analysis may involve transforming the signal input(s) from the dynamic sensors from a time domain to a frequency domain, such as via a Fourier Transform, Fast Fourier Transform (FFT), or the like. Decisional Step 720 involves determining if/when to add a new vibration mechanism. For example, new vibration data trends may be observed over time after additional tools runs are performed and the associated data collected. New trends may arise, for example, from using existing tools with a previously established data set in new drilling conditions, such as new geography or formations, new well designs, new downhole conditions, or design updates to the tool itself, which may reveal new problem frequencies or other patterns. Those vibration mechanisms may be added over time per decisional step 720. This may entail, for example, time-frequency analysis, wavelet analysis, or time series analysis.

Step 730 involves identifying the sensor(s) to be used for obtaining the Vibration indexes for all the vibration mechanisms identified in Step 710 or added in Decisional Step 720. A related challenge is to find a variable or a combination of variables that has a strong correlation with tool failure. Therefore, sensors may be identified after the model is developed or updated. Decisional Step 740 involves identification of new measurements being enabled.

Redundant measurement can be identified based on sensor sampling time. Only new information is added.

Step 750 is to determine the method for computing the vibration index for each vibration mechanism. This may be performed for an entire downhole operation or a specific operational phase. This step may involve data pre-processing such as described above. Then a plurality of frequency bins may be defined. Processed data may be used to determine the index based on an associated magnitude threshold. Integrals may be obtained for magnitudes exceeding thresholds set for each frequency bin. Each threshold may be based on aggregated magnitude using processed data. Alternatively, each threshold may be based on aggregated delta magnitude using processed data.

Decisional Step 760 involves identification of a new method for computing an index. This may comprise identifying a new method for computing an existing index, or a new method for obtaining a new index. As with Decisional Step 720, the identification of a new method for computing the index may be an incremental improvement over time as a result of new data. The new method may be a new (e.g., faster, more accurate) way to obtain an existing index or a new method for obtaining a new index. When a new method for computing an index is conceived, Step 750 is re-performed.

In case of multiple sensors in the BHA for a given sensor type, Step 770 is to select a primary sensor for each vibration mechanism.

Step 780 is to determine the vibration index for all identified vibration mechanism during a downhole operation or post run and sending the data to a data repository (e.g., a data lake) where tool run data is aggregated.

Figure 8:
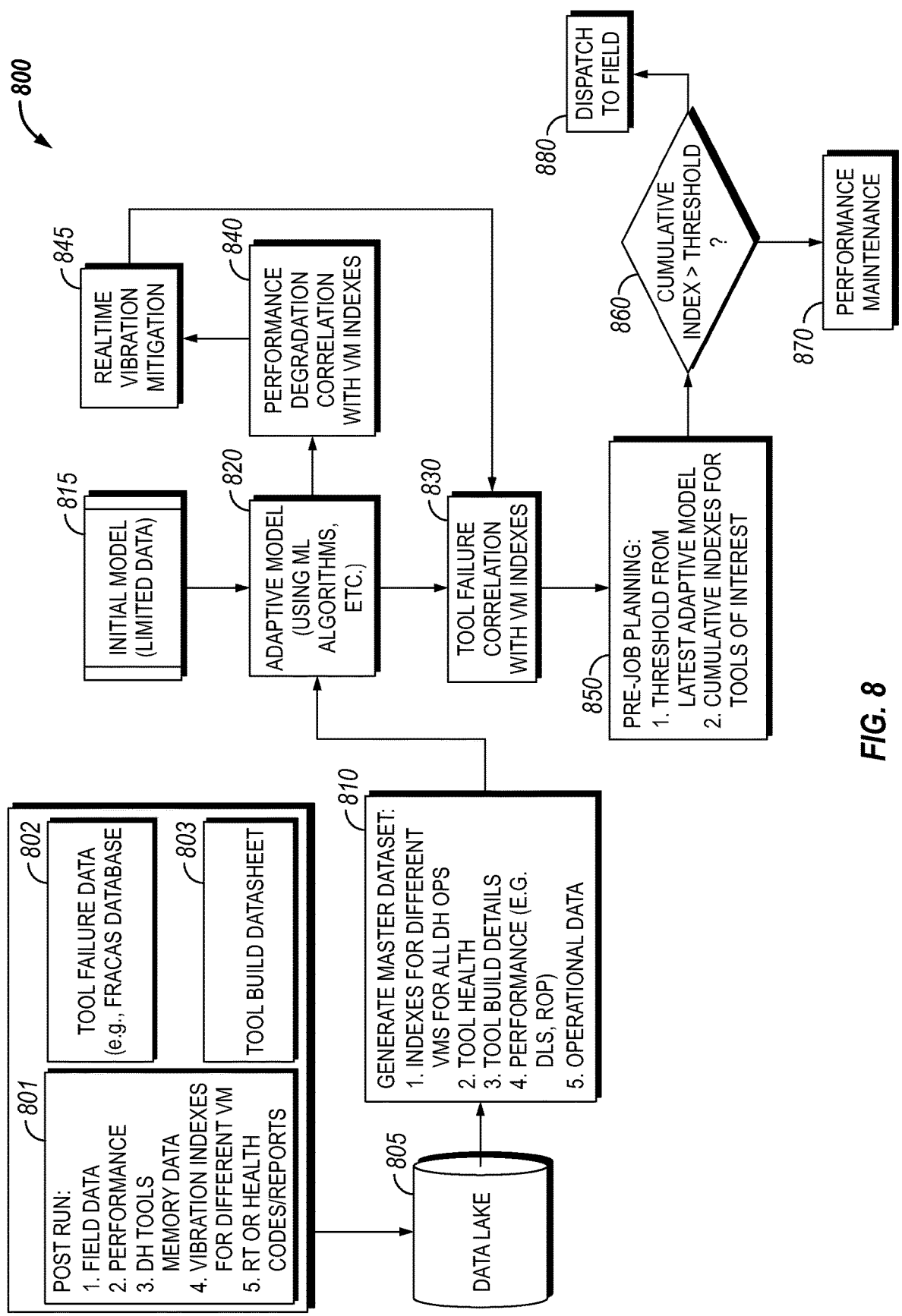
FIG. 8 is a block diagram and flowchart of another example workflow involving the correlation of tool failures and/or performance degradation with vibration indexes.

FIG. 8 is a block diagram and flowchart 800 of another example workflow involving the correlation of tool failures and/or performance degradation with vibration indexes. Three categories of data sets 801, 802, 803 are identified as inputs to a Data Lake 805. The first data set comprises post-run data 801. This may include field data, such as surface and real-time (RT) data. Performance metrics may also be included, such as rate of penetration (ROP), dogleg severity (DLS), a build/turn rate, LWD/MWD log quality, for example. Tool failure data 802 may also be input from a database, such as a FRACAS ((Failure reporting, analysis and corrective action system) database, which is a repository for all gathered failure information. A tool build dataset 803 may also be included describing the particular build for each tool.

All of the data may be aggregated over time in the Data Lake 805. The Data Lake 805 may be dynamically updated and may be accessible to users operating tools worldwide. Process 810 is data curation to generate a master dataset. This may include indexes for different vibration mechanisms for all downhole operations. This may also include tool health status and tool build details, as well as performance reports (e.g., DLS and ROP) and operational data.

An initial model 815 based on limited data (e.g., an initial training set) may be provided to an adaptive model 820 using ML algorithms, etc., such as generally discussed with reference to FIG. 2. The adaptive model 820 may comprise, for example, the machine learning module 225 of FIG. 2 or components thereof. That initial model 815 may be supplemented over time with data aggregated from the Data Lake 810, which may be input to the adaptive model 820. The adaptive model 820 may be trained with the initial data set and continuously re-trained and refined over time with the addition of new data.

The adaptive model 820 may be used to obtain various types of correlations useful for fleet management using predictive analysis. One correlation generated by the adaptive model 820 is a tool failure correlation 830 that correlates tool failures with the vibration indexes. Another correlation that may be generated by the adaptive model 820 includes a performance degradation correlation 840 that correlates tool performance or performance degradation with the vibration indexes.

In one or more embodiments, the correlations generated by the adaptive model 820 may be used for real-time vibration mitigation. A real-time vibration mitigation system may use established Vibration indexes and correlations (e.g. tool failure correlation 830 or performance degradation correlation 840) to prioritize vibration mechanism mitigation. Mitigating a vibration mechanism may entail adjusting a downhole parameter, such as WOB (weight on bit), RPM, etc.

In one or more embodiments, the correlations generated by the adaptive model 820 may be used for pre-job planning (e.g., tool selection) for subsequent downhole operations (tool runs) as per pre-job planning block 850. The pre-job planning block 850 may involve the thresholds obtained from the latest adaptive model 820 using cumulative vibration indexes for tools of interest. For example, the cumulative index (summation of prior, per-job index values) for each tool may be monitored, and a tool may be selected for a next job that is expected to maintain the cumulative index below the threshold at which failure is likely to occur.

At some point, the cumulative index for any given tool will exceed the threshold. As per decisional step 860, the workflow may involve determining when a threshold has been exceeded by the cumulative index for the tool, or pre-emptively determining when a threshold is on the verge of being exceeded in a next tool run, in which case maintenance may be triggered per step 870. Those tools that are safely below their respective cumulative index may be dispatched to the field, subject to other pre-deployment checks being met. After a tool has had scheduled maintenance and/or repairs, the cumulative index may be reset, e.g. to a zero value.

Accordingly, the present disclosure may provide systems and methods for establishing correlations between tool performance and tool failures to specific vibration mechanisms or other mechanisms that the tools are exposed to during a downhole (DH) operation. The methods/systems/compositions/tools may include any of the various features disclosed herein, including one or more of the following statements.

Statement 1. A method, comprising: obtaining vibration data and failure data for a plurality of downhole tools over a plurality of tool runs collectively performed by the downhole tools; using the vibration data and failure data from the tool runs to train a machine learning model to generate a predictive function correlating failure with vibration; and applying the predictive function to predict tool failure or performance degradation of one or more of the downhole tools.

Statement 2. The method of Statement 1, further comprising: identifying one or more problem frequency from the vibration data having a significant correlation with tool failure; and wherein the predictive function generated by the machine learning model is based at least in part on a portion of the vibration data in the vicinity of the problem frequency.

Statement 3. The method of Statement 2, wherein the predictive function generated by the machine learning model is based at least in part on the vibration data above a threshold amplitude at the problem frequencies.

Statement 4. The method of any of Statements 1 to 3, wherein obtaining the vibration data comprises analyzing a signal input from an accelerometer, a gyroscope, a magnetometer, or a combination thereof.

Statement 5. The method of Statement 4, wherein identifying the one or more problem frequency comprises transforming one or more vibration signal inputs from the downhole tool from a time domain to a frequency domain to identify frequencies and their amplitudes.

Statement 6. The method of any of Statements 1 to 5, further comprising: using the predictive function to generate a vibration index for each tool run, wherein a probability of tool failure varies with a magnitude of the vibration index.

Statement 7. The method of Statement 6, wherein generating the vibration index for each tool run comprises obtaining frequency and amplitude data for each of a plurality of frequency bins.

Statement 8. The method of Statement 6 or 7, further comprising: tracking a cumulative index for each downhole tool based on a combination of the vibration indexes for that downhole tool over a plurality of tool runs and using the cumulative index to predict the tool failure or performance degradation.

Statement 9. The method of Statement 8, further comprising: identifying a cumulative index threshold above which tool failure is probable; and comparing the cumulative index from one or more of the downhole tools to the cumulative index threshold to predict a tool failure or performance degradation of the respective one or more of the downhole tools.

Statement 10. The method of Statement 8 or 9, further comprising: receiving a description of one or more incoming jobs to be performed; obtaining vibration indexes for the incoming jobs; and planning the incoming jobs, including selecting from among the plurality of downhole tools to perform the incoming jobs based on the cumulative indexes of the downhole tools and the vibration indexes of the incoming jobs.

Statement 11. The method of any of Statements 1 to 10, further comprising: dynamically updating the machine learning model with additional vibration and failure data from one or more additional tool runs.

Statement 12. The method of any of Statements 1 to 11, further comprising: performing real-time vibration mitigation comprising adjusting one or more system parameters on one or more of the downhole tools.

Statement 13. A machine learning data system, comprising: a data pre-processing module configured for analyzing dynamic sensor input to identify one or more vibration mechanisms associated with a downhole tool; a machine learning (ML) training module configured for identifying a correlation between dynamic sensor data and failure data for a plurality of downhole tools; and a predictive module configured to correlate the one or more vibration mechanism with tool failure or performance.

Statement 14. The machine learning data system of Statement 13, wherein the predictive module is configured to generate a vibration index for each of a plurality of tool runs performed by one or more downhole tools.

Statement 15. The machine learning data system of Statement 14, wherein the predictive module is configured to generate the vibration index for each tool run based on frequency and amplitude data for each of a plurality of frequency bins.

Statement 16. The machine learning data system of Statement 14 or 15, further comprising: a job planning module configured for: tracking cumulative indexes combining the vibration indexes of the one or more downhole tools, estimating vibration indexes for one or more incoming jobs to be performed, and planning the incoming jobs, including selecting from among the one or more downhole tools to perform the incoming jobs based on the cumulative indexes of the downhole tools and the vibration indexes of the incoming jobs.

Statement 17. The machine learning data system of Statement 16, wherein the job planning module is configured to selectively assign the downhole tools to the incoming jobs for which a cumulative index threshold correlated with tool failure will not be exceeded by addition of the vibration index of the assigned incoming jobs or to schedule maintenance for the downhole tools for which the cumulative index threshold will be exceeded by addition of the vibration index of the assigned incoming jobs.

Statement 18. The machine learning data system of any of Statements 13 to 17, wherein the data pre-processing module is configured to identify one or more problem frequency, at least in part by transforming one or more vibration signal inputs from the downhole tool from a time domain to a frequency domain to identify frequencies and their amplitudes.

Statement 19. A system, comprising: a tool string incorporating a downhole tool subject to vibrations responsive to operation of the downhole tool and one or more dynamic sensors; a data pre-processing module configured for analyzing a signal from the one or more dynamic sensors to identify one or more vibration mechanisms associated with a downhole tool; a machine learning data system including a predictive module configured to obtain a predictive function correlating one or more vibration mechanism with tool failure or performance, including by obtaining a vibration index for each of a plurality of tool runs and a cumulative index for each downhole tool combining the vibration indexes for the tool runs performed by the respective downhole tool; and a vibration mitigation system configured for dynamically adjusting one or more system parameters of the downhole tool according to the predictive function to reduce a probability of a tool failure.

Statement 20. The system of Statement 19, wherein the tool string is a drilling string and the downhole tool is a rotary steerable system. To facilitate a better understanding of the present invention, the following examples of certain aspects of some embodiments are given. In no way should the following examples be read to limit, or define, the entire scope of the disclosure.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method, comprising:
    obtaining vibration data and failure data for a plurality of downhole tools over a plurality of tool runs collectively performed by the plurality of downhole tools;
    using the vibration data and the failure data from the plurality of tool runs to train a machine learning model to generate a predictive function correlating failure with vibration;
    applying the predictive function to predict a tool failure or a performance degradation of a downhole tool of the plurality of downhole tools;
    using the predictive function to generate a vibration index for each tool run of the plurality of tool runs, wherein a probability of the tool failure varies with a magnitude of the vibration index;
    tracking a cumulative index for each downhole tool, of the plurality of downhole tools, based on a combination of the vibration indexes for that downhole tool over the plurality of tool runs and using the cumulative index to predict the tool failure or the performance degradation;
    receiving a description of an incoming job to be performed;
    obtaining estimated vibration indexes for the incoming job;
    planning the incoming job, including selecting one or more downhole tools from the plurality of downhole tools to perform the incoming job based on the cumulative index of each of the plurality of downhole tools and the vibration indexes of the incoming job; and
    performing real-time vibration mitigation for the incoming job comprising using the vibration indexes for the incoming job and the cumulative index of each of the selected one or more downhole tools to control a system parameter on each of the selected one or more downhole tools to avoid the predicted tool failure or the performance degradation.

2. The method of claim 1, further comprising:
    identifying a problem frequency from the vibration data having a significant correlation with the tool failure; and
    wherein the predictive function generated by the machine learning model is based at least in part on a portion of the vibration data comprising the problem frequency.

3. The method of claim 2, wherein the predictive function generated by the machine learning model is based at least in part on the vibration data above a threshold amplitude at the problem frequency.

4. The method of claim 1, wherein obtaining the vibration data comprises analyzing a signal input from an accelerometer, a gyroscope, a magnetometer, or a combination thereof.

5. The method of claim 2, wherein identifying the problem frequency comprises transforming a vibration signal input from the downhole tool from a time domain to a frequency domain to identify frequencies and their amplitudes.

6. The method of claim 1, wherein generating the vibration index for each tool run comprises obtaining frequency and amplitude data for each of a plurality of frequency bins.

7. The method of claim 1, further comprising:
    identifying a cumulative index threshold above which the tool failure is probable; and
    comparing the cumulative index from the downhole tool to the cumulative index threshold to predict the tool failure or the performance degradation.

8. The method of claim 1, further comprising:
    dynamically updating the machine learning model with additional vibration data and additional failure data from an additional tool run.

9. A machine learning data system, comprising:
    a data pre-processing module configured to:
        analyze dynamic sensor input to identify a vibration mechanism associated with a downhole tool;
    a machine learning training module configured to:
        identify a correlation between dynamic sensor data and failure data for the downhole tool;
    a predictive module configured to:
        obtain a predictive function correlating the vibration mechanism with a tool failure or a performance degradation of the downhole tool; and
        generate vibration indexes for a plurality of tool runs, respectively, of the downhole tool; and
    a job planning module configured to:
        track a cumulative index combining the vibration indexes of the downhole tool;
        generate an estimated vibration index for an incoming job to be performed;
        select the downhole tool to perform the incoming job based on the cumulative index of the downhole tool and the estimated vibration index; and
        perform real-time vibration mitigation for the incoming job comprising using the estimated vibration index for the incoming job and the cumulative index of the selected downhole tool to control a system parameter on the selected downhole tool to avoid the tool failure or the performance degradation.

10. The machine learning data system of claim 9, wherein the predictive module is further configured to:
    generate a vibration index, of the vibration indexes, for each tool run based on frequency and amplitude data for each of a plurality of frequency bins.

11. The machine learning data system of claim 9, wherein the job planning module is further configured to:
    selectively assign the downhole tool to a plurality of incoming jobs for which a cumulative index threshold correlated with tool failure will not be exceeded by an addition of the estimated vibration index; or
    schedule maintenance for the downhole tool for which the cumulative index threshold will be exceeded by the addition of the estimated vibration index.

12. The machine learning data system of claim 9, wherein the data pre-processing module is further configured to:
   identify a problem frequency by transforming a vibration signal input from the downhole tool from a time domain to a frequency domain to identify frequencies and their amplitudes.

13. The machine learning data system of claim 9, wherein the machine learning training module is further configured to:
   dynamically update using additional vibration data and additional failure data from an additional tool run.

14. The machine learning data system of claim 9, generate the vibration indexes for the plurality of tool runs comprises:
   obtaining frequency and amplitude data for each of a plurality of frequency bins.

15. A system, comprising:
   a tool string incorporating a downhole tool subject to vibrations responsive to operation of the downhole tool and a dynamic sensor;
   a data pre-processing module configured to:
      analyze a signal from the dynamic sensor to identify a vibration mechanism associated with the downhole tool;
   a machine learning training module configured to:
      identify a correlation between dynamic sensor data and failure data for the downhole tool;
   a predictive module configured to:
      obtain a predictive function correlating the vibration mechanism with a tool failure or a performance degradation of the downhole tool
      generate vibration indexes for a plurality of tool runs, respectively, of the downhole tool; and
      generate a cumulative index for the downhole tool, wherein the cumulative index is a combination of the vibration indexes;
   a vibration mitigation system configured to:
      dynamically adjust a system parameter of the downhole tool according to the predictive function to reduce a probability of the tool failure or the performance degradation; and
   a job planning module configured to:
      track the cumulative index;
      generate an estimated vibration index for an incoming job to be performed;
      select the downhole tool to perform the incoming job based on the cumulative index and the estimated vibration index; and
      perform real-time vibration mitigation for the incoming job comprising using the estimated vibration index for the incoming job and the cumulative index of the selected downhole tool to control the system parameter on the selected downhole tool to avoid the tool failure or the performance degradation.

16. The system of claim 15, wherein the tool string is a drilling string and the downhole tool is a rotary steerable system.

17. The system of claim 15, wherein the predictive module is further configured to:
   generate a vibration index, of the vibration indexes, for each tool run based on frequency and amplitude data for each of a plurality of frequency bins.

18. The system of claim 15, wherein the job planning module is further configured to:
   selectively assign the downhole tool to a plurality of incoming jobs for which a cumulative index threshold correlated with tool failure will not be exceeded by an addition of the estimated vibration index; or
   schedule maintenance for the downhole tool for which the cumulative index threshold will be exceeded by the addition of the estimated vibration index.

19. The system of claim 15, wherein the data pre-processing module is further configured to:
   identify a problem frequency by transforming a vibration signal input from the downhole tool from a time domain to a frequency domain to identify frequencies and their amplitudes.

20. The system of claim 15, wherein the machine learning training module is further configured to:
   dynamically update using additional vibration data and additional failure data from an additional tool run.

* * * * *